United States Patent [19]

Zweegers

[11] Patent Number: 4,686,818
[45] Date of Patent: Aug. 18, 1987

[54] MOWING MACHINE

[76] Inventor: Petrus W. Zweegers, Nuenenseweg 165, P.O. Box 9, 5660 AA Geldrop, Netherlands

[21] Appl. No.: 790,623

[22] Filed: Oct. 23, 1985

Related U.S. Application Data

[63] Continuation-in-part of Ser. No. 632,384, Jul. 19, 1984, abandoned.

[30] Foreign Application Priority Data

Jul. 16, 1983 [NL] Netherlands ............. 8302556

[51] Int. Cl.⁴ ............................................. A01D 55/18
[52] U.S. Cl. ........................................ 56/192; 56/13.6; 56/6
[58] Field of Search ................... 56/6, 13.6, 192, 370, 56/371, DIG. 21, 377

[56] References Cited

FOREIGN PATENT DOCUMENTS

| 2524348 | 12/1976 | Fed. Rep. of Germany | 56/6 |
| 2703043 | 7/1978 | Fed. Rep. of Germany | 56/192 |
| 1488684 | 7/1967 | France | 56/192 |

Primary Examiner—Gene Mancene
Assistant Examiner—John G. Weiss
Attorney, Agent, or Firm—Edmund M. Jaskiewicz

[57] ABSTRACT

The invention relates to a mowing machine comprising a frame and at least four cutting members rotatable about upwardly extending rotary axes and being each provided with cutters and drums located above said cutters, the cutting members being driven so that during operation neighboring drums rotate in opposite senses, whereby the diameters of the circles described by the ends of the cutters of the outermost cutting members during operation are larger than those of the intermediate cutting members.

3 Claims, 3 Drawing Figures

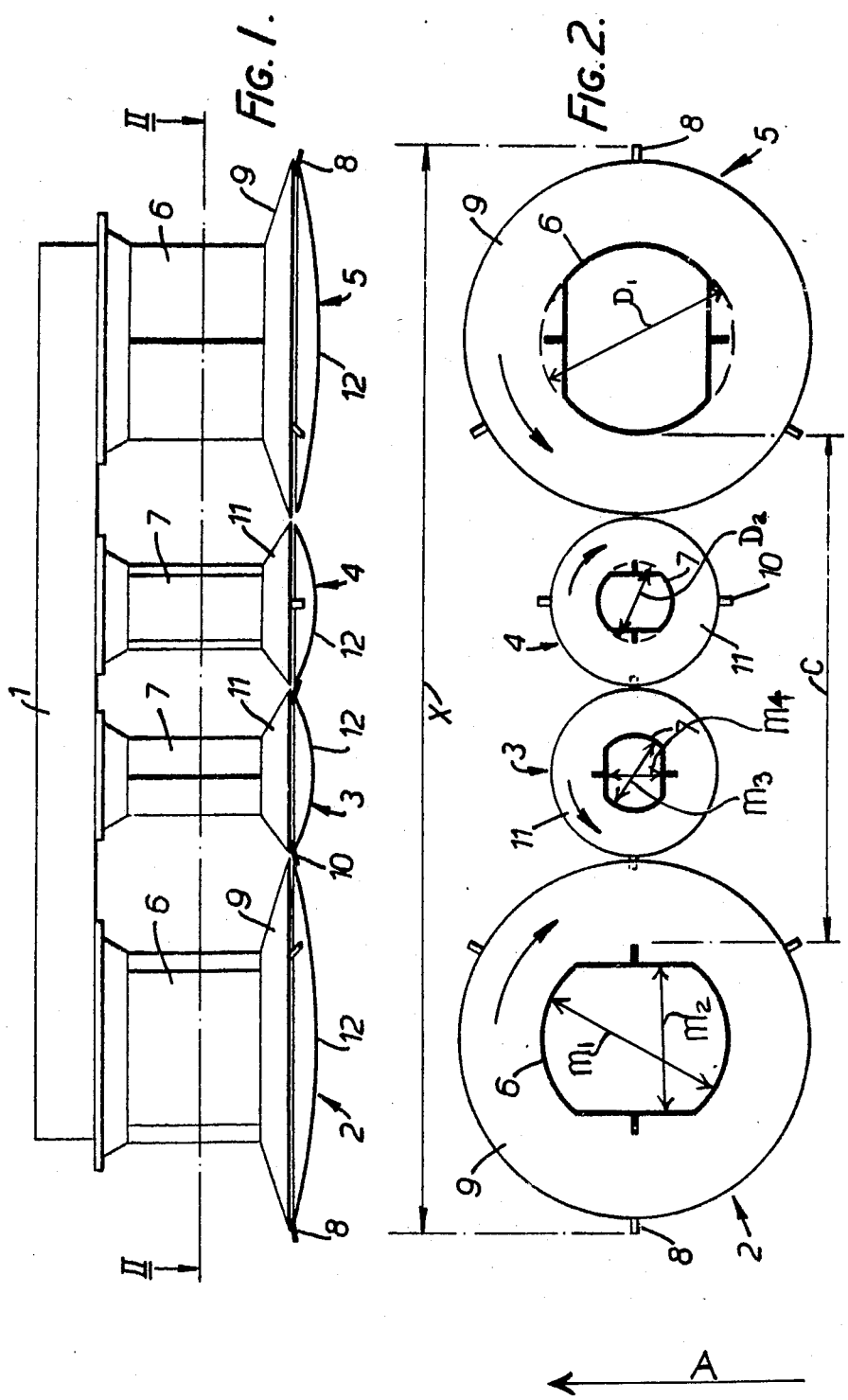

MOWING MACHINE

RELATED APPLICATION

The present application is a continuation-in-part of the application Ser. No. 632,384 filed July 19, 1984 and now abandoned.

The present invention relates to a mowing machine, more particularly, to such a machine having a frame and at least four cutting members rotatable about upwardly extending rotary axes and each provided with cutters and drums arranged above said cutters, the cutting members being driven so that during operation neighboring drums rotate in opposite senses.

In such mowers, which have been generally used for many years, the various cutting members are identical, which means that the ends of the knives describe circles of equal diameters during operation, while the drums all have the same cross-sectional areas. The cut crop is displaced between the drums of cutting members rotating in opposite senses to the rear and deposited behind the mower in a swath, the width of which corresponds approximately to the distance between the proximal sides of the drums of the outermost cutting members. By using swath boards disposed behind the drums the width of the swath can be slightly reduced, if desired. However, in the case of mowing machines having a large working width the width of a swath thus formed may be so large, in particular when such a mower is mounted at the front of a tractor, that this so-called front mower has the disadvantage that the tractor wheels cannot be prevented from running across the cut crop, which is, of course, undesirable. Also in using so-called pick-up wagons, the width of the swath to be picked up must not be too large.

It is therefore the object of the present invention to provide such a mowing machine wherein the crop can be deposited in a simple manner in a swath which is narrower than the conventional swaths produced by such mowers.

According to the invention, this object is achieved by a mowing machine having a frame upon which are mounted four cutting members rotatable about upwardly extending axes. The cutting members are provided with drive means which during operation rotate adjacent cutting members in opposite directions. The two outermost cutting members on the ends of the frame have larger diameter cutting circles than the cutting circles of the knives of the intermediate cutting members. In addition, the cross sectional areas of the drums of the outermost cutting members are larger than the sectional areas of the drums of the intermediate cutting members.

Other objects and advantages of the invention will be apparent upon reference to the accompanying description when taken in conjunction with the following drawings, which are exemplary, wherein:

FIG. 1 is a schematic side elevation view of a mower embodying the invention.

FIG. 2 is a schematic sectional view taken along the line II—II in FIG. 1.

Proceeding next to the drawings wherein like reference symbols indicate the same parts throughout the various views a specific embodiment and modifications of the present invention will be described in detail.

Figure 3:
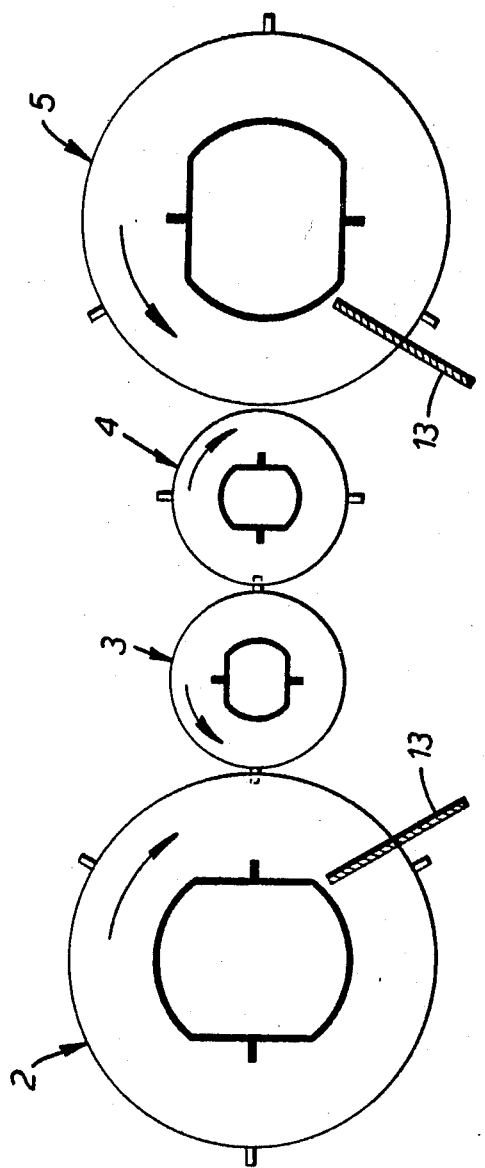
FIG. 3 is a sectional view similar to that of FIG. 2 and showing a potential disposition of swath boards.

The mowing machine shown in FIGS. 1 and 2 comprises an elongate hollow, rigid frame beam 1, below which four cutting members 2 to 5 are fastened. The cutting members have a conventional structure and are provided with a drum, an annular collar adjoining the lower end of the drum and having cutting knives secured to it and a supporting dish located beneath the collar.

From the drawings it will be apparent that the drums 6 of the two outermost cutting members 2 and 5 have an appreciably larger cross-sectional area than the drums 7 of the two inner cutting members 3 and 4. Accordingly, the outer diameters of the annular collars supporting the cutters 8 of the outermost cutting members are materially larger than the outer diameters of the annular collars 11 supporting the cutters 10 of the inner drums 3 and 4. In the embodiment shown the diameter of the circle described by free ends of the cutters 10 of the inner cutting members 3 and 4 is about half the diameter of the circle described by the ends of the cutters 8 of the outermost cutting members 2 and 5. The size of the drum section is adapted thereto. The cutting members are also provided with saucer-shaped supporting dishes 12 of matching magnitude.

The cutting members can be driven in a conventional manner through a transmission mechanism housed in the hollow frame beam 1 in a manner such that the neighboring cutting members rotate in opposite senses as is indicated by arrows in FIG. 2. Moreover the mower is provided in a conventional manner with means (not shown) for attaching the mower to an agricultural tractor or the like and with means for driving the cutting members through the transmission mechanism in the hollow frame beam 1 from the power take-off shaft of a tractor or the like, as known in the art.

As stated above, the machine is particularly suitable for being mounted at the front of a tractor of the like, for which purpose, of course, appropriate coupling members are connected with the frame part 1 in order to enable hitching the mower to the front end of the tractor so that a vertical plane lying midway between the inner cutting members 3 and 4 and being normal to the frame beam 1 coincides with the vertical longitudinal central plane of the tractor. During operation, the mowing machine is moved in the direction indicated by the arrow A and the cut crop is displaced to the rear between each pair of neighboring drums 6 and 7, where it is deposited in two swaths separated by a width indicated by the line C in FIG. 2.

Since in the device described above the outermost cutting members have a materially larger diameter drum than the intermediate cutting members, these outermost cutting members will displace the crop over a larger distance towards the middle of the machine than in a conventional arrangement in which the mowing width indicated by the line X is covered by four cutting members of equal diameters. Therefore, when using the construction according to the present invention, namely, larger diameter outer drums, with the same mowing width X the width C of the swath formed is smaller than the width of a swath formed by a conventional mowing device, as for example, in U.S. Pat. No. 3,389,559.

As may be seen in the drawings, the drums are shaped or profiled in cross section so as to convey the cut crop between a pair of adjacent drums and then deposit the cut crop in a swath or windrows to the rear of the mowing machine. With two pairs of adjacent drums, i.e., 6 and 7 as in FIG. 1, the width of the swath, i.e., distance between the two windrows, it is determined by the distance between the inner surfaces of the outer drums. The distance between the inner surfaces of the outer drums 6 will then determine the width of the swath, regardless of the diameters of the cutters.

While FIG. 1 shows the inner cutters 11 to be smaller in diameter than the outer cutters 9, the same result, namely, a narrowed windrow for the same mowing width X, would be obtained using a mowing machine having four cutters of equal diameters but where the diameter of the outer drums was greater than the diameter of the inner drums.

It is apparent that the magnitudes of the diameters of the outer drums determine the forming and depositing of the swath upon the ground. A mere difference in diameter of the cutters of itself will not influence the width of the cut swath. Further, in a mowing machine of four cutting members, the diameters of the outer drums must be greater than the diameters of the inner drums to achieve this result, namely, a narrower swath with respect to the mowing width of the machine.

In the embodiments shown in the drawings, particularly FIG. 2, the drums have a non-circular cross-section. The outer drums have a large middle line $M_1$ and a small middle line $M_2$. Similarly, the small or inner drums have a large middle line $M_3$ and a small middle line $M_4$.

However, as also stated above the drums may have a circular cross-section (as shown in dotted lines, wherein the outer drums will have a diameter $D_1$ equal to the middle line $M_1$ and the inner drums will have a diameter $D_2$ equal to the middle line $M_3$.

FIG. 3 schematically shows that the swath width may be further reduced when swath boards 13 or swath wheels are diposed near the outermost mowing drums 6.

The supporting dishes 12 of the outermost cutting members are preferably adjustable in a vertical direction in order to set selectively the cutting height. These large supporting dishes together can unobjectionally support the device so that no adjustable dishes are needed for the intermediate drums.

The figures used in the claims are only meant to explain more clearly the intention of the invention and are not supposed to be any restriction concerning the interpretation of the invention.

It will be understood that this invention is susceptible to modification in order to adapt it to different usages and conditions, and accordingly, it is desired to comprehend such modifications within this invention as may fall within the scope of the appended claims.

What is claimed is:

1. A mowing machine comprising a rigid frame beam, at least four cutting members carried by said frame beam and rotatable about upwardly extending rotary axes and being each provided with cutters and drums located above said cutters, said drums each having the same height, the cutting members being driven so that during operation neighboring drums rotate in opposite senses characterized in that the diameters of the circles described by the ends of the cutters of the outermost cutting members during operation are larger than those of the intermediate cutting members and the sectional areas of the drums of the outermost cutting members are larger than those of the intermediate cutting members whereby the swath of the cut crop is reduced with respect to the mowing width of the cutting members.

2. A mowing machine as claimed in claim 1 chartacterized in that the diameter of a circle described by the ends of the cutters of an outermost cutting member is about twice the diameter of the circle described by the ends of the cutters of an intermediate cutting member.

3. A mowing machine as claimed in claim 2 characterized in that the diameter or the larger and small middle line of an outermost drum is approximately equal to or larger than twice the diameter or the larger and smaller middle line respectively of a drum of a cutting member located between the outermost cutting members.

* * * * *